US011689562B2

(12) United States Patent
Devane et al.

(10) Patent No.: US 11,689,562 B2
(45) Date of Patent: Jun. 27, 2023

(54) DETECTION OF RANSOMWARE

(71) Applicant: McAfee, LLC, San Jose, CA (US)

(72) Inventors: Oliver G. Devane, Upton (GB);
Abhishek Karnik, Portland, OR (US);
Sriram P, Bangalore (IN)

(73) Assignee: McAfee, LLC, San Jose, CA (US)

( * ) Notice: Subject to any disclaimer, the term of this patent is extended or adjusted under 35 U.S.C. 154(b) by 244 days.

(21) Appl. No.: 16/904,330

(22) Filed: Jun. 17, 2020

(65) Prior Publication Data

US 2021/0400057 A1 Dec. 23, 2021

(51) Int. Cl.
*H04L 9/40* (2022.01)
*H04L 43/16* (2022.01)
*G06F 16/17* (2019.01)
*G06F 21/62* (2013.01)

(52) U.S. Cl.
CPC ........ *H04L 63/145* (2013.01); *G06F 16/1734* (2019.01); *G06F 21/6218* (2013.01); *H04L 43/16* (2013.01)

(58) Field of Classification Search
CPC ... H04L 63/145; H04L 43/16; G06F 16/1734; G06F 21/6218
See application file for complete search history.

(56) References Cited

U.S. PATENT DOCUMENTS

| | | | |
|---|---|---|---|
| 9,292,687 B2 | 3/2016 | Thure et al. | |
| 9,317,686 B1 | 4/2016 | Ye et al. | |
| 9,734,337 B1 | 8/2017 | Patton et al. | |
| 9,785,775 B1* | 10/2017 | Turner | G06F 21/568 |
| 10,409,986 B1* | 9/2019 | Natanzon | G06F 12/1408 |
| 10,503,897 B1* | 12/2019 | Striem-Amit | G06F 21/552 |
| 10,621,346 B1* | 4/2020 | Singh | H04L 63/145 |
| 10,893,068 B1* | 1/2021 | Khalid | G06F 11/3409 |
| 2016/0378988 A1* | 12/2016 | Bhashkar | G06F 21/566 |
| | | | 726/24 |
| 2017/0359370 A1* | 12/2017 | Humphries | H04L 63/1416 |
| 2018/0024893 A1* | 1/2018 | Sella | G06F 21/554 |
| | | | 707/648 |
| 2018/0121650 A1* | 5/2018 | Brown | G06F 21/565 |

(Continued)

OTHER PUBLICATIONS

Ashwini Balkrushna Kardile "Crypto ransomware analysis and detection using process monitor", 2017, Master of Sciences in Computer Science, University of Texas, Arlington, 49 pages (Year: 2017).*

(Continued)

*Primary Examiner* — Catherine Thiaw
(74) *Attorney, Agent, or Firm* — Patent Capital Group

(57) ABSTRACT

An apparatus, including systems and methods, for detecting ransomware is disclosed herein. For example, in some embodiments, an apparatus includes a memory element operable to store instructions; and a processor operable to execute the instructions, such that the apparatus is configured to receive data identifying a process and a plurality of files accessed by the process; identify an access indicator associated with each of the plurality of files accessed by the process, wherein the access indicator includes file type; determine whether the access indicator exceeds a threshold; interrupt, based on a determination that the access indicator exceeds a threshold, the process; and prompt a user to allow or disallow the process to proceed.

18 Claims, 7 Drawing Sheets

| | First Access Indicator | Second Access Indicator | Lower Threshold Value | Higher Threshold Value |
|---|---|---|---|---|
| 1. | Number of File Types | N/A | 8 | 12 |
| 2. | Number of File Types | Number of Files per File Type | 5 File Types and 5 Files per File Type | 10 File Types and 10 Files per File Type |
| 3. | Number of File Types | Age of File | 5 File Types and 5 Files having an Age > 30 days | 10 File Types and 10 Files having an Age > 6 months |
| 4. | Number of File Types | Frequency of Access | 15 File Types accessed in 15 secs or less | 20 File Types accessed in 30 secs or less |

(56) References Cited

U.S. PATENT DOCUMENTS

| | | | | |
|---|---|---|---|---|
| 2018/0293379 A1* | 10/2018 | Dahan | ............... | G06F 21/568 |
| 2018/0307839 A1* | 10/2018 | Bhave | ............... | G06F 21/552 |
| 2019/0087572 A1* | 3/2019 | Ellam | ............... | G06F 21/561 |
| 2019/0108340 A1* | 4/2019 | Bedhapudi | ............ | G06F 21/554 |
| 2019/0158512 A1* | 5/2019 | Zhang | ............... | H04L 63/1416 |
| 2019/0228148 A1* | 7/2019 | Pohl | ............... | G06F 3/0659 |
| 2019/0228153 A1 | 7/2019 | Scaife et al. | | |
| 2019/0303571 A1* | 10/2019 | Chelarescu | ............ | G06F 21/56 |
| 2020/0250306 A1* | 8/2020 | Pendyala | ............ | G06F 16/1748 |
| 2020/0342104 A1* | 10/2020 | Palisse | ............... | G06F 21/566 |
| 2020/0387609 A1* | 12/2020 | Hansen | ............... | G06F 21/554 |
| 2021/0049277 A1* | 2/2021 | Mueller-Wicke | ..... | H04L 63/145 |
| 2021/0097181 A1* | 4/2021 | Reid | ............... | G06F 21/565 |

OTHER PUBLICATIONS

10. Scaife N, Carter H, Traynor P Butler KR. "Cryptolock (and drop it): stopping ransomware attacks on user data". In 2016 IEEE 36th international conference on distributed computing systems (ICDCS) Jun. 27, 2016 (pp. 303-312). IEEE (Year: 2016).*

* cited by examiner

| First Access Indicator | Second Access Indicator | Lower Threshold Value | Higher Threshold Value |
|---|---|---|---|
| 1. Number of File Types | N/A | 8 | 12 |
| 2. Number of File Types | Number of Files per File Type | 5 File Types and 5 Files per File Type | 10 File Types and 10 Files per File Type |
| 3. Number of File Types | Age of File | 5 File Types and 5 Files having an Age > 30 days | 10 File Types and 10 Files having an Age > 6 months |
| 4. Number of File Types | Frequency of Access | 15 File Types accessed in 15 secs or less | 20 File Types accessed in 30 secs or less |

FIG. 3

```
{
  3680: {
    '.PNG': {
      'count': 1983
    },
    '.TXT': {
      'count': 1506
    },
    '.HTML': {
      'count': 1354
    },
    '.ZIP': {
      'count': 5
    },
    '.PY': {
      'count': 2
    },
    '.JPG': {
      'count': 332
    },
    '.CSS': {
      'count': 155
    },
    '.JS': {
      'count': 659
    },
    '.MP3': {
      'count': 1155
    },
    '.SVG': {
      'count': 347
    },
    '.JPEG': {
      'count': 4
    },
    '.7Z': {
      'count': 2
    }
  },
  8488: {
    '.XML': {
      'count': 1
    }
  },
  10544: {
    '.DLL': {
      'count': 1
    },
    '.DAT': {
      'count': 1
```

FIG. 4

| Rule | Number of Extensions | Count/Ext |
|---|---|---|
| 1 | 5 | >10 |
| 2 | 5 | >5 |

FIG. 5A

| Ransomware | Detected | Rules | Encrypted Files (with Detection) | Total Files | Files saved % |
|---|---|---|---|---|---|
| Dharma | YES | 1 | 1011 | 14275 | 93% |
| Ryuk | YES | 1 | 663 | 8808 | 92% |
| Sodinokibi | YES | 1 | 682 | 993 | 31% |
| Matrix | YES | 1 | 276 | 1257 | 78% |
| Gandcrab | YES | 1 | 260 | 996 | 74% |
| Maze | YES | 1 | 700 | 1300 | 46% |
| WannaCry | YES | 1 | 839 | 2062 | 59% |
| Dharma | YES | 2 | 306 | 14275 | 98% |
| Ryuk | YES | 2 | 882 | 8808 | 90% |
| Sodinokibi | YES | 2 | 669 | 993 | 33% |
| Matrix | YES | 2 | 257 | 1257 | 80% |
| Gandcrab | YES | 2 | 110 | 996 | 89% |
| WannaCry | YES | 2 | 166 | 2062 | 92% |

FIG. 5B

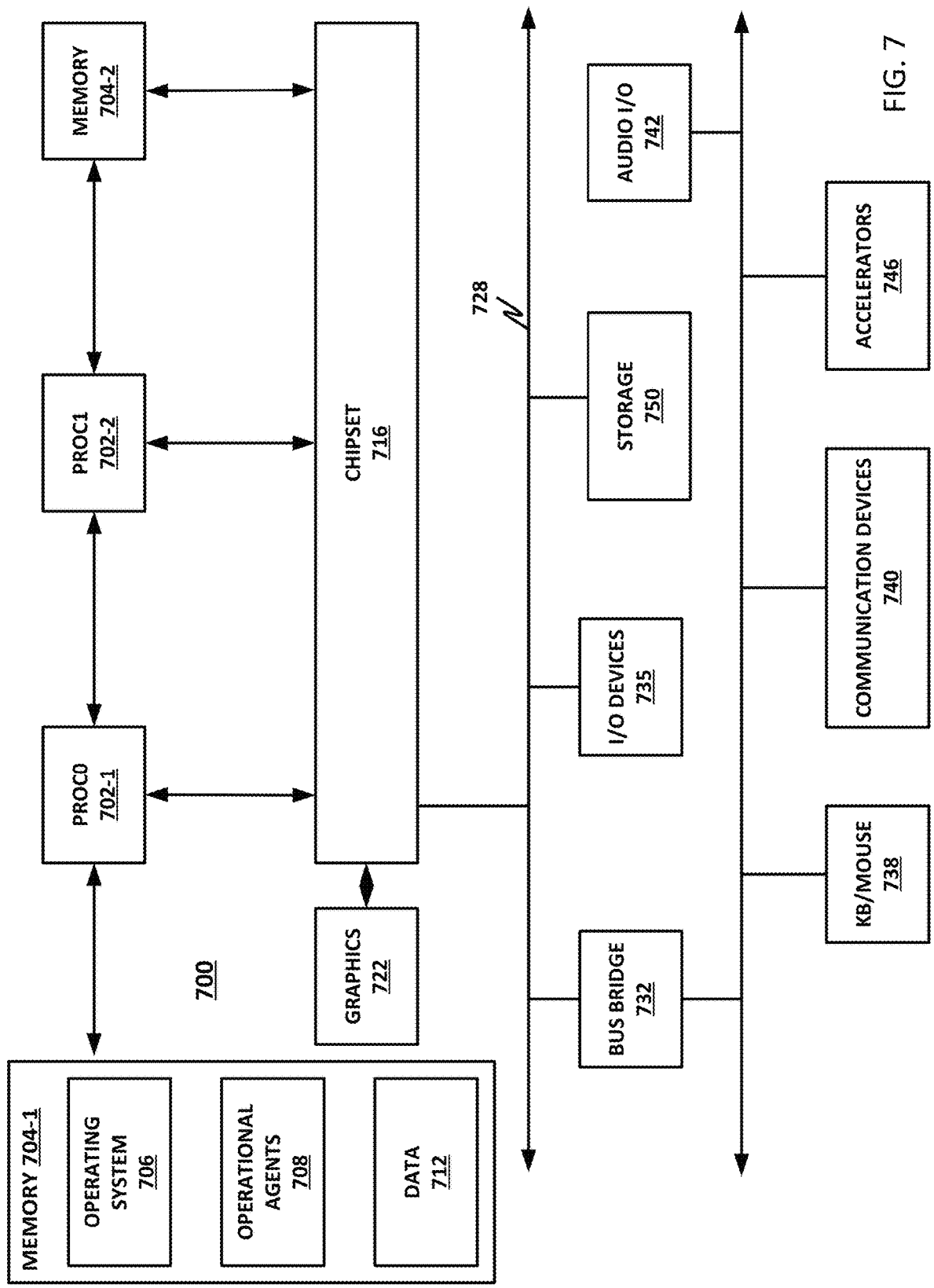

DETECTION OF RANSOMWARE

TECHNICAL FIELD

This disclosure relates in general to computer security and, more particularly though not exclusively, to a system and method for detecting ransomware.

BACKGROUND

The field of computer security has become increasingly important in today's society. While the use of computer networks has transformed business and personal communications, it has also been used as a vehicle for malicious operators to gain unauthorized access to computers. The number of cyberattacks that target networked user devices as well as networked computers in corporate organizations continue to increase year after year, including ransomware, which has become widespread.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIG. 3 is a table illustrating exemplary threshold values based on identified access indicators, in accordance with various embodiments of the present disclosure.

FIG. 4 are examples of stores created by three processes, in accordance with an embodiment of the present disclosure.

FIGS. 5A and 5B are tables showing experimental thresholds and results of example embodiments of the present disclosure detecting real-world ransomware samples.

FIG. 7 is a block diagram of selected elements of a hardware platform.

DETAILED DESCRIPTION

Figure 1:
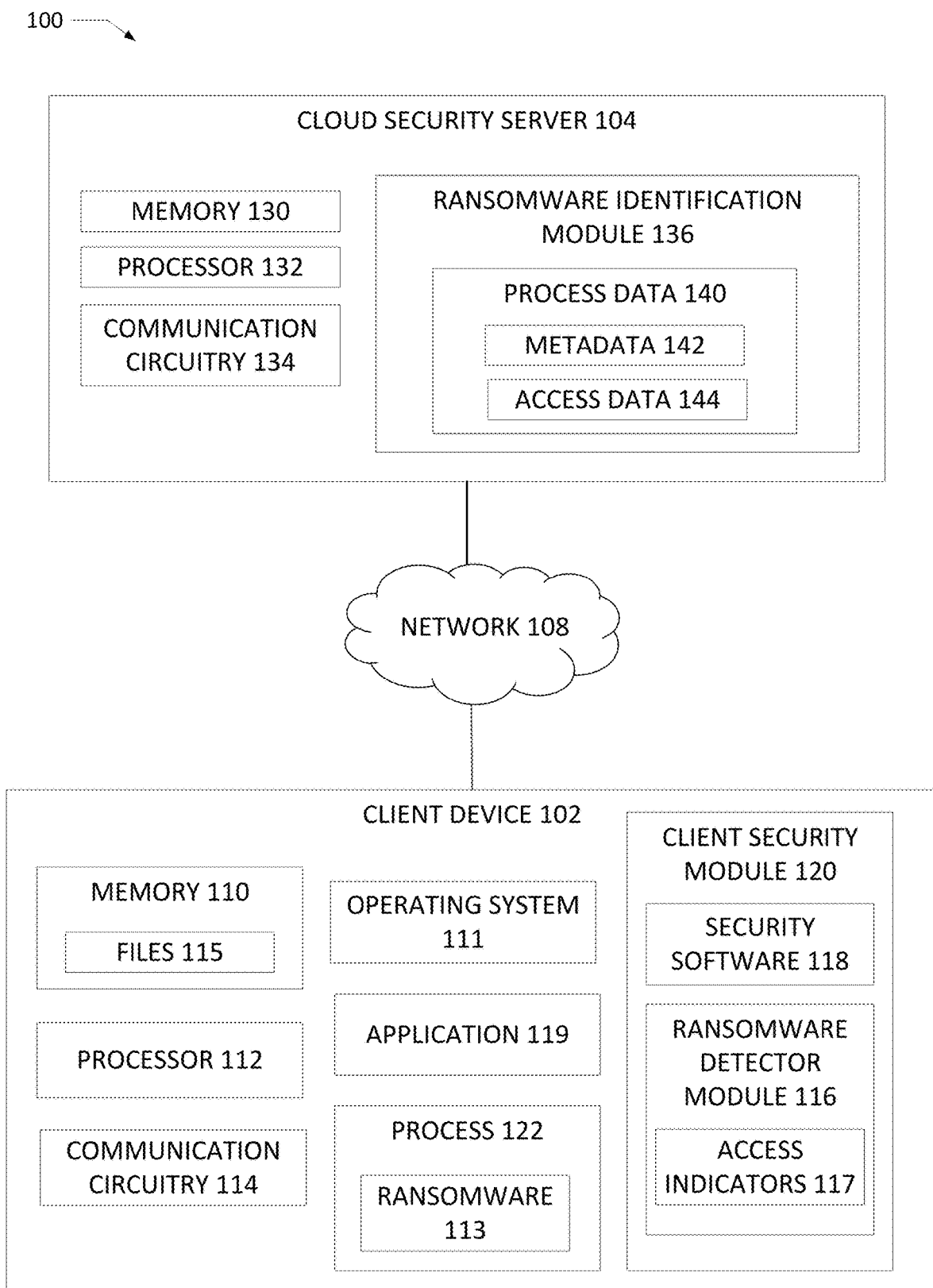
FIG. 1 is a simplified block diagram of an example system for detecting ransomware, in accordance with an embodiment of the present disclosure.

An apparatus, including systems and methods, for detecting ransomware is disclosed herein. For example, in some embodiments, an apparatus includes a memory element operable to store instructions; and a processor operable to execute the instructions, such that the apparatus is configured to receive data identifying a process and a plurality of files accessed by the process; identify an access indicator associated with each of the plurality of files accessed by the process, wherein the access indicator includes file type; determine whether the access indicator exceeds a threshold; interrupt, based on a determination that the access indicator exceeds a threshold, the process; and prompt a user to allow or disallow the process to proceed.

Ransomware programs, which are a variant of trojan programs, infect their target computer systems using different techniques, for example, by attaching executable files to emails or by attacking a vulnerability in the network service to gain access to the target computer system. As used herein, ransomware refers to a family of malicious programs that blocks user interaction with the operation of a computer system or with a portion of the computer system. In some cases, ransomware blocks access by encrypting files. In other cases, ransomware blocks access by locking the files and/or the computer. Once engaged, ransomware works swiftly to disable access to valuable data, frequently, in a matter of minutes. Ransomware generally functions by targeting user data stored on a computer, rendering the data unavailable to the user, and then demanding payment before enabling the user to access or recover the data. Conventional methods to combat ransomware involve techniques to decrypt files after encryption without paying for a decryption code. Unfortunately, cyber criminals have become more sophisticated in adapting their tactics and in effecting ransomware attacks to infiltrate and hijack computer systems and in using stronger cryptography, which makes it incredibly difficult to decrypt files after an infection. A system and method for quickly and accurately detecting ransomware in real-time may be desired.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The drawings are not necessarily to scale.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The meaning of "a," "an," and "the" include plural references. The meaning of "in" includes "in" and "on." When used to describe a range of dimensions, the phrase "between X and Y" represents a range that includes X and Y. Although certain elements may be referred to in the singular herein, such elements may include multiple sub-elements.

FIG. 1 is a simplified block diagram of a security system 100 that enables detection of ransomware, in accordance with an embodiment of the present disclosure. The security system 100 disclosed herein may be configured to detect ransomware by monitoring a process accessing a plurality of files on a device and by identifying access indicators that are characteristic of ransomware behavior. A ransomware program may exhibit particular behaviors when infecting their target computer system. For example, a ransomware program may access a large number of files of file types in a short period of time. Most programs access files of a specific type (e.g., files having a specific file extension or files of a specific type with a limited number of file extension). For example, Microsoft® Word® opens and reads files that are text documents (e.g., files having the file extension .doc, .docx, .rtf, or .txt), but is unlikely to open and read files that are a programming language, such as Python® or Javascript® (e.g., files having the file extension .py or .js, respectively). Such access behavior is suspicious and, particularly suspicious, if performed within a short time frame. As used herein, the term access refers to opening and reading a file or data.

As illustrated in FIG. 1, an embodiment of security system 100 may include a client device 102, a cloud security server 104, and network 108. The client device 102 may include memory 110, a processor 112, communication circuitry 114, files 115 stored in memory 110, an operating system 111, an application 119, a client security module 120, and a suspect process 122 that may include ransomware 113. The client security module 120 may include a ransomware detector module 116 and security software 118. The ransomware detector module 116 may discover potential ransomware 113 on the client device 102 by identifying and analyzing access indicators 117 associated with the process 122 accessing the files 115 stored in memory 110. The cloud security server 104 may include memory 130, a processor 132, communication circuitry 134, and a ransomware identification module 136. The ransomware identification module 136 may identify ransomware 113 by analyzing process data 140 received from the client security module 120. The process data 140 may include metadata 142 associated with the suspect process and/or access data 144, which is data associated with the files accessed by the suspect process 122. The client device 102 and the cloud security server 104 may be in communication using network 108.

The client device 102 may include the client security module 120 to protect the client device 102 from cyber-attacks. The client security module 120 may include a ransomware detector module 116. The ransomware detector module 116 may be configured to timely detect and suspend possible ransomware 113 before the ransomware has an opportunity to completely block access to the files. For example, the ransomware detector module 116 may identify and monitor a process 122 accessing a plurality of files 115 on a client device 102, may identify access indicators 117 associated with the files 115 being accessed, may determine whether the access indicators 117 exceed a threshold value, may interrupt the process 122, and, optionally, may classify the process 122 as ransomware or may communicate process data 140 associated with the process to a cloud security server 104 for identification and/or classification by the ransomware identification module 136. Examples of access indicators 117 identified by the ransomware detector module 116 for an individual file accessed by the process include file type (e.g., file extension) and age of the file (e.g., date that the file was last accessed or saved). Examples of access indicators 117 identified by the ransomware detector module 116 for a plurality of files accessed by the process 122 include a number of files the process accessed for each file type (e.g., how many files of each different file type were accessed) and a frequency, or speed, at which the process is accessing the files (i.e., a number of files accessed within a time period). In some embodiments, the process 122 may be associated with an application 119 downloaded and stored on the client device 102. In some embodiments, the process 122 may be associated with executable software downloaded on the client device 102. The client security module 120 may further include security software 118, such as McAfee® Total Protection, to prevent new malware from being installed, to detect malware or potential malware, and to remove or disable malware that has infected the client device 102. In some embodiments, the ransomware detector module 116 may be part of the security software 118. In some embodiments, the ransomware detector module 116 may be separate from the security software 118, as shown in FIG. 1.

The client device 102 may be a network element and include, for example, desktop computers, laptop computers, mobile devices, personal digital assistants, smartphones, tablets, or other similar devices. The client device 102 also may be referred to herein as "user device" or "electronic device." The client device 102 may include one or more processors 112 for executing any type of instructions associated with the user device achieving the operations detailed herein. The processor 112 is connected to memory 110 and communication circuitry 114. The processor 112 may be based on one or more processors, microcontrollers, microprocessors, and programmable logic devices, among others. The memory 110 may store computer executable instructions or computer executable components as well as other data. The processor 112 executes computer executable instructions stored in memory 110. The communication circuitry 114 may be used to send and receive commands, requests, and other data to and from the client device 102. The client security module 120 may be connected to the processor 112, the memory 110, and the communication circuitry 114 to perform the operations described herein.

Cloud security server 104 may include memory 130, a processor 132, communication circuitry 134, and a ransomware identification module 136. The processor 132 is connected to memory 130 and communication circuitry 134. The processor 132 may be based on one or more processors, microcontrollers, microprocessors, and programmable logic devices, among others. Memory 130 may store computer executable instructions or computer executable components as well as other data. The processor 132 executes computer executable instructions stored in memory 130. The communication circuitry 134 may be used to send and receive commands, requests, and other data to and from the cloud security server 104. The ransomware identification module 136 may be connected to the processor 132, the memory 130, and the communication circuitry 134 to perform the operations described herein. The ransomware identification module 136 may receive process data 140 from the client security module 120. The process data 140 may include metadata 142 of the suspect process accessing files and access data 144 associated with the files accessed by the suspect process. The process data 140, metadata 142, and access data 144 may be stored in memory 130.

The ransomware identification module 136 may receive, from the client device 102, process data 140, and may analyze the process data 140 to identify ransomware associated with the suspect process. The ransomware identification module 136 may send, to the client device 102, the results of the analysis (e.g., the assigned identification and classification of the ransomware), and may recommend a remediation and/or a corrective action.

The one or more processors 112 of the client device 102 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processors may be implemented in hardware, or combinations of hardware, and software and/or firmware, as appropriate. Software or firmware implementations of the processors may include computer-executable or machine-executable instructions written in any suitable programming language to perform the various functions described. Hardware implementations of the processors may be configured to execute computer-executable or machine-executable instructions to perform the various functions described. The client device 102 may include a chipset (not shown) for controlling communications between one or more processors and one or more of the other components of the device. The processors 112 may also include one or more application specific integrated circuits (ASICs) or application specific standard products (ASSPs) for handling specific data processing functions or tasks.

The client device 102 may include one or more memory elements 110 for storing information and data. The one or more memory elements 110 may include one or more volatile and/or non-volatile memory devices such as, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 110 may store program instructions that are loadable and executable on the processor(s) as well as data generated or received during the execution of these programs. The memory 110 may have stored thereon software modules and/or instructions associated with other components of the device. The memory 110 may include one or more operating systems application software 111. The operating system 111 is a specialized program that manages the hardware and software resources of the computer and provides common services to the application 119. For example, the operating system 111 may manage competing demands made to the processor 112, the memory 110, and the communication circuitry 114 by programs and executing processes. An application 119 may include programs for performing a particular set of functions, tasks, or activities for the user. Examples of applications 119 may include word processors, spreadsheet programs, web browsers, programming applications, and imaging applications, among others. In some cases, an application 119 may be a source of ransomware that is hidden in the application. The ransomware may infect the client device 102 when the application 119 is installed.

The client device 102 may include communication circuitry 114. The communication circuitry 114 may be embodied as any communication circuitry, device, or collection thereof, capable of enabling communications between the client device 102 and other remote devices (e.g., the remote malware identification module 136). The terms "communication circuitry" and "input/output (I/O) circuitry" may be used interchangeably herein. The communication circuitry 114 may be configured to use any one or more communication technology (e.g., wireless or wired communications) and associated protocols (e.g., Ethernet, Bluetooth®, Wi-Fi®, WiMAX, etc.) to effect such communication. The client device 102 may further include GPS and other location identifiers. The client device 102 may further include peripheral devices (not shown), which may include any number of additional peripheral or interface devices and associated I/O circuitry, such as speakers, microphones, additional storage devices, among others.

Network 108 represents interconnected communication paths for receiving and transmitting packets of information that propagate through the security system 100. Network 108 may provide a communicative interface between devices and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 108 may include a network controller.

In security system 100, network traffic, which is inclusive of packets, frames, signals, and data, among others, may be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may be provided. Suitable interfaces and infrastructure may be provided to enable communication with the cellular network.

The term "packet" as used herein, refers to a unit of data that may be routed between networked devices or between a device and the cloud security server 104. A packet may include a source network address and a destination network address. These network addresses may be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, and/or data.

As used in any embodiment herein, the term "module" may refer to hardware, firmware and/or circuitry configured to perform any of the aforementioned operations. A module also may include software. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms a part of one or more devices, as defined previously. The terms "module," "engine," and "administrator" may be used interchangeably herein.

Figure 2:
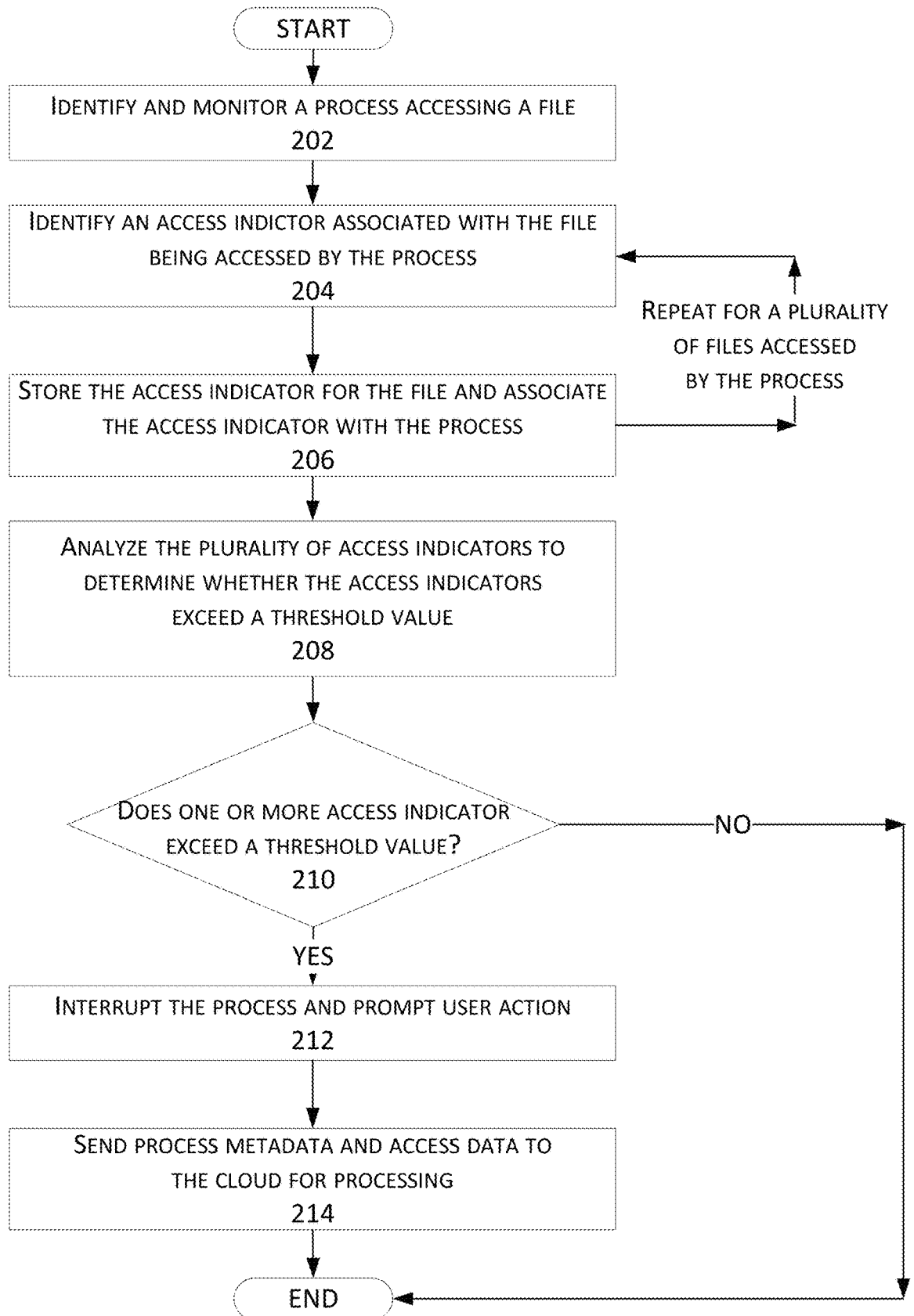
FIG. 2 is a simplified block diagram illustrating potential operations that may be associated with detecting ransomware, in accordance with an embodiment of the present disclosure.

FIG. 2 is a simplified flowchart illustrating potential operations that may be associated with detecting a process that includes ransomware, in accordance with an embodiment of the present disclosure. The one or more operations may be performed by the ransomware detector module 116. At 202, a process accessing a file on the client device is identified and monitored. In some embodiments, access data associated with a process may be received from an operating system event tracking log, such as Windows® ETW, that records all events on the client device, including file opens and reads performed by a process. At 204, an access indictor associated with the file being accessed by the process is identified. In some embodiments, the access indicator is a file type (e.g., a file extension). In some embodiments, more than one access indicator may be identified. For example, a first access indicator and a second access indicator may be identified, where the first access indicator is the file type and the second access indicator is an age of the file. At 206, the identified access indicator for the file is stored and associated with the process (e.g., identified as being accessed by the process). In some embodiments, other file information that is related to the access indicators may be stored as well, such as, when (i.e., time and date) the file was accessed, the filename, the file extension, and the size of the file. The operations at 204 and 206 may be repeated to identify all files accessed by the process and to identify access indicators for each file accessed by the process. At 208, the plurality of access indicators is analyzed to determine whether the access indicators exceed a threshold value. A threshold value may be assigned based the access indicators identifying likely ransomware behavior. In some embodiments, the threshold value may be assigned based on one identified access indicator, such as, file type, where a threshold value may be equal to eight file types. For example, the access indicators may be analyzed to determine the number of different file types accessed by the process, and, if the process accessed more than eight different file types, then the access indicators exceeded the threshold value. In some embodiments, a threshold value may be assigned based on two or more identified access indicators, such as, file type and the number of files of each file type. For example, the access indicators may be analyzed to determine the number of different file types accessed by the process and the number of files for each different file type that were accessed. In some embodiments, a threshold value is equal to ten file types with each file type being accessed at least ten times. The assignment of threshold values is described in more detail with reference to FIG. 3. At 210, a determination is made as to whether one or more of the access indicators exceeded a threshold value. If the one or more access indicators do not exceed the threshold value, the process ends. If the one or more access indicators exceed the threshold value, the process continues to 212. At 212, the process is interrupted, and a user is prompted to take action with respect to the process. For example, a user may be prompted via a pop-up window to allow the process to proceed or to confirm disruption of the process and prohibit the process from proceeding. At 214, metadata and access data related to the process may be sent to a cloud server for processing to determine whether the process includes ransomware. In some embodiments, the cloud server may identify the ransomware and may assign a corrective action or prompt the ransomware detector module 116 or the security software 118 to remediate the ransomware.

FIG. 3 is a table illustrating exemplary threshold values based on identified access indicators, in accordance with various embodiments of the present disclosure. As described above, a threshold value may be assigned based the access indicators identifying likely ransomware behavior. The threshold value may vary from client device-to-client device depending on the device configuration and capability, and may vary from client-to-client depending on the client's risk level and the client's desired level of protection. In some embodiments, the ransomware detector module 116 may include multiple threshold values, for example, a lower threshold value (i.e., a stricter standard) and a higher threshold value (i.e., a less strict standard). As shown in Example 1, the threshold value may be assigned based on a first access indicator, such as, a number of file types accessed by the process. In the first example, a lower threshold value is equal to eight file types, and a higher threshold value is equal to 12 file types. In some embodiments, a threshold value may be assigned based on two or more identified access indicators, such as shown in Examples 2-4. In Example 2, the first access indicator is the number of file types accessed and the second access indicator is the number of files of each file type accessed. The access indicators may be analyzed to determine the number of different file types accessed by the process and the number of files for each different file type that were accessed. In Example 2, a lower threshold value is equal to five file types with each file type being accessed at least five times, and a higher threshold value is equal to ten file types with each file type being accessed at least ten times. In Example 3, the first access indicator is the number of file types accessed and the second access indicator is an age of the files being accessed. As used herein, an age of a file refers to a date the file was created, a date that the file was last saved, or a date that the file was last accessed, whichever date is available or whichever date is shorter. As shown in Example 3, a lower threshold value is equal to five file types with five files having an age greater than 30 days, and a higher threshold value is equal to ten file types with ten files having an age greater than six months. In Example 4, the first access indicator is the number of file types accessed and the second access indicator is a frequency (e.g., speed) at which the files are being accessed. As shown in Example 4, a lower threshold value is equal to fifteen file types accessed in fifteen seconds or less, and a higher threshold value is equal to twenty file types accessed in thirty seconds or less. The access indicators may be analyzed to determine whether the process exceeded one or more of the threshold values, and, if the process exceeded a threshold level, then the process would be suspended or disabled, for example, by the ransomware detector module 116 or by the security software 118.

FIG. 4 are examples of stores created by three processes, in accordance with an embodiment of the present disclosure. When a process accessing files is monitored, a store may be created similar to that depicted in FIG. 4. The ransomware detector module 116 may identify and monitor a process, and create a store identifying the process using a unique identifier (e.g., 3680), identifying the file types accessed by the process as indicated by the file extensions (e.g., .PNG, .TXT, .HTML, etc.), and identifying the number of files of each file type accessed by the process (e.g., count). For example, as shown in FIG. 4, the process 3680 accessed twelve file types (i.e., .PNG, .TXT, .HTML, .ZIP, .PY, .JPG, .CSS, .JS, .MP3, .SVG, .JPEG, and .7Z) and a total of 7504 files (i.e., process 3680 accessed 1983 .PNG files, 1506 .TXT files, 1354 .HTML files, etc.). The file types accessed by the process 3680 include image/graphics files (i.e., .PNG, .JPG, .JPEG, and .SVG), text files (i.e., .TXT), web browser/web applications (i.e., .HTML and .CSS), compressed files (i.e., .ZIP and .7Z), programming files (i.e., .PY and JS), and audio files (i.e., .MP3). Based on these access indicators, process 3680 exceeds the threshold values in FIG. 3 (i.e., Example 1 or Example 2), and is likely to include ransomware. FIG. 4 further includes stores for a process 8488, which accessed one file and one file type (i.e., .XML). Based on these access indicators, process 8488 does not exceed the threshold values in FIG. 3 and is likely not ransomware. FIG. 4 further includes stores for a process 105444, which accessed one file each of two file types (i.e., .DLL and .DAT). Based on these access indicators, process 10544 does not exceed the threshold values in FIG. 3 and is likely not ransomware.

FIGS. 5A and 5B are tables showing experimental thresholds and results of example embodiments of the present disclosure detecting real-world ransomware samples. FIG. 5A identifies the two threshold values applied, referred to as Rule 1 and Rule 2. The threshold values of Rule 1 and Rule 2 include a first access indicator, a number of file types accessed (e.g., number of extensions), and a second access indicator, a number of files of each file type accessed (e.g., count/extension). Rule 1 has a threshold value of five file types with ten or more files of each file type being accessed. Rule 2 has a threshold value of five file types with five or more files of each file type being accessed. FIG. 5B lists the experimental results of process data and access data received from Windows® ETW event tracking logs on various client devices. The experimental results include the ransomware included with the process (e.g., the subsequently identified ransomware), whether the ransomware was detected, a rule applied from FIG. 5A (i.e., Rule 1 or Rule 2), a number of files accessed and subsequently encrypted by the process, a total number of files on the client device, and a percent of files that were not encrypted due to detecting ransomware and disabling the process. As shown in FIG. 5B, ransomware was detected every time, and subsequently identified as ransomware, and in almost three-quarters of the cases, using the techniques described herein, ransomware was detected and more than 70% of the files on a client device were saved.

Figure 6:
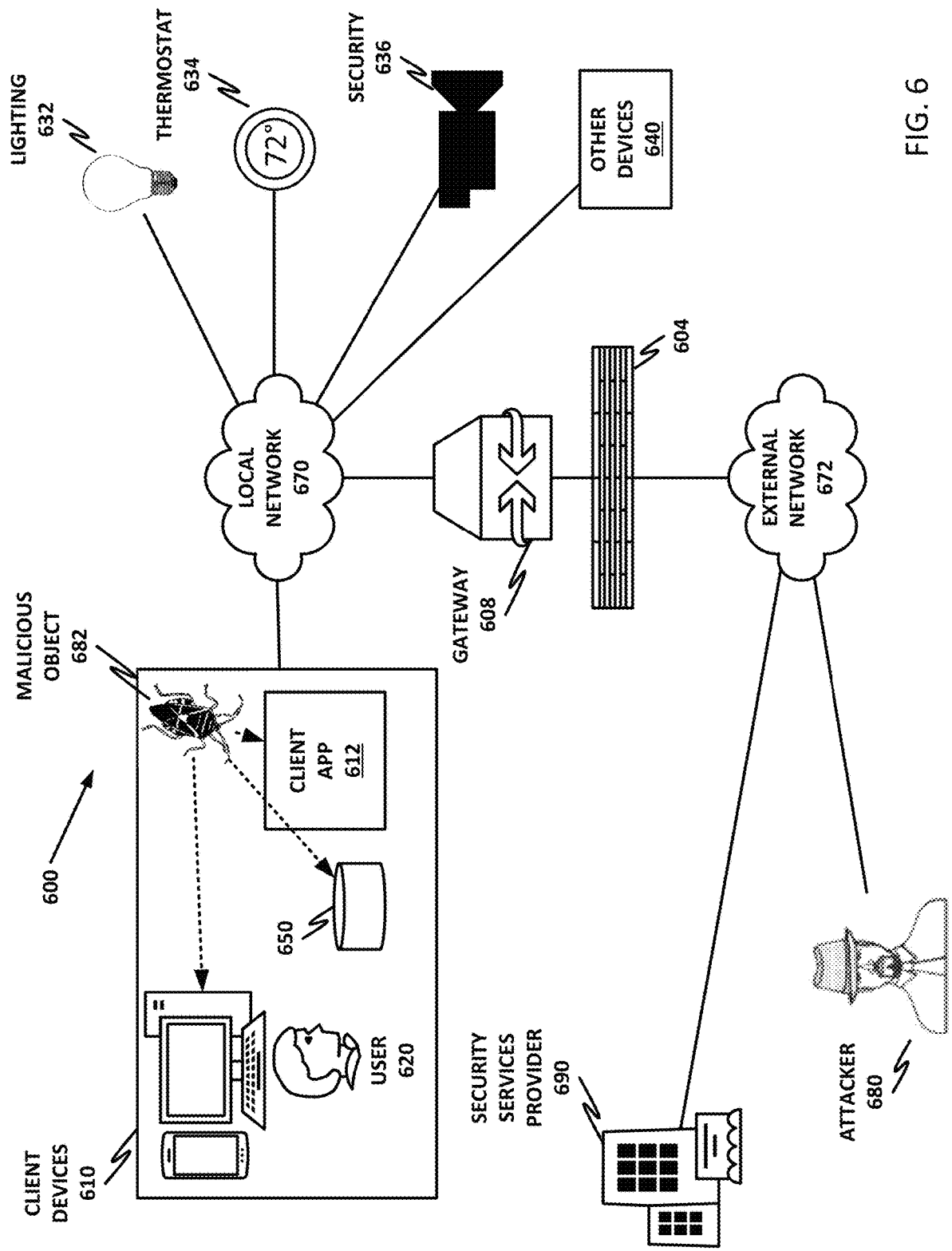
FIG. 6 is a block diagram of selected elements of a security ecosystem.

FIG. 6 is a block diagram of a security ecosystem 600. In the example of FIG. 6, security ecosystem 600 may be an enterprise, a government entity, a data center, a telecommunications provider, a "smart home" with computers, smart phones, and various internet of things (IoT) devices, or any other suitable ecosystem. Security ecosystem 600 is provided herein as an illustrative and nonlimiting example of a system that may employ, and benefit from, the teachings of the present specification.

Within security ecosystem 600, one or more users 620 operate one or more client devices 610. A single user 620 and single client device 610 are illustrated here for simplicity, but a home or enterprise may have multiple users, each of which may have multiple devices, such as desktop computers, laptop computers, smart phones, tablets, hybrids, or similar.

Client devices 610 may be communicatively coupled to one another and to other network resources via local network 670. Local network 670 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 670 may also include one or more servers, firewalls, routers, switches, security appliances, antivirus servers, or other network devices, which may be single-purpose appliances, virtual machines, containers, or functions. Some functions may be provided on client devices 610.

In this illustration, local network 670 is shown as a single network for simplicity, but in some embodiments, local network 670 may include any number of networks, such as one or more intranets connected to the internet. Local network 670 may also provide access to an external network, such as the internet, via external network 672. External network 672 may similarly be any suitable type of network.

Local network 670 may connect to the internet via gateway 608, which may be responsible, among other things, for providing a logical boundary between local network 670 and external network 672. Local network 670 may also provide services such as dynamic host configuration protocol (DHCP), gateway services, router services, and switching services, and may act as a security portal across local boundary 604.

In some embodiments, gateway 608 may be a standalone internet appliance. Such embodiments are popular in cases in which ecosystem 600 includes a home or small business. In other cases, gateway 608 may run as a virtual machine or in another virtualized manner. In larger enterprises that features service function chaining (SFC) or network function virtualization (NFV), gateway 608 may be include one or more service functions and/or virtualized network functions.

Local network 670 may also include a number of discrete IoT devices. For example, local network 670 may include IoT functionality to control lighting 632, thermostats or other environmental controls 634, a security system 636, and any number of other devices 640. Other devices 640 may include, as illustrative and nonlimiting examples, network attached storage (NAS), computers, printers, smart televisions, smart refrigerators, smart vacuum cleaners and other appliances, and network connected vehicles.

Local network 670 may communicate across local boundary 604 with external network 672. Local boundary 604 may represent a physical, logical, or other boundary. External network 672 may include, for example, websites, servers, network protocols, and other network-based services. In one example, an attacker 680 (or other similar malicious or negligent actor) also connects to external network 672. A security services provider 690 may provide services to local network 670, such as security software, security updates, network appliances, or similar. For example, MCAFEE, LLC provides a comprehensive suite of security services that may be used to protect local network 670 and the various devices connected to it.

It may be a goal of users 620 to successfully operate devices on local network 670 without interference from attacker 680. In one example, attacker 680 is a malware author whose goal or purpose is to cause malicious harm or mischief, for example, by injecting malicious object 682 into client device 610. Once malicious object 682 gains access to client device 610, it may try to perform work such as social engineering of user 620, a hardware-based attack on client device 610, modifying storage 650 (or volatile memory), modifying client application 612 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 680 to leverage against local network 670.

Malicious harm or mischief may take the form of installing root kits or other malware on client devices 610 to tamper with the system, installing spyware or adware to collect personal and commercial data, defacing websites, operating a botnet such as a spam server, or simply to annoy and harass users 620. Thus, one aim of attacker 680 may be to install his malware on one or more client devices 610 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 680 may also want to commit industrial or other espionage, such as stealing classified or proprietary data, stealing identities, or gaining unauthorized access to enterprise resources. Thus, attacker's strategy may also include trying to gain physical access to one or more client devices 610 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 680. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 670 may contract with or subscribe to a security services provider 690, which may provide security services, updates, antivirus definitions, patches, products, and services. MCAFEE, LLC is a nonlimiting example of such a security services provider that offers comprehensive security and antivirus solutions. In some cases, security services provider 690 may include a threat intelligence capability such as McAfee's GTI database, or similar product. Security services provider 690 may update its threat intelligence database by analyzing new candidate malicious objects as they appear on client networks and characterizing them as malicious or benign.

Other security considerations within security ecosystem 600 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

FIG. 7 is a block diagram of a hardware platform 700. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 700, even though they may be scattered across a data center, or even located in different data centers.

Hardware platform 700 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 700 is arranged in a point-to-point (PtP) configuration. This PtP configuration is popular for personal computer (PC) and server-type devices, although it is not so limited, and any other bus type may be used.

Hardware platform 700 is an example of a platform that may be used to implement embodiments of the teachings of this specification. For example, instructions could be stored in storage 750. Instructions could also be transmitted to the hardware platform in an ethereal form, such as via a network interface, or retrieved from another source via any suitable interconnect. Once received (from any source), the instructions may be loaded into memory 704, and may then be executed by one or more processor 702 to provide elements such as an operating system 706, operational agents 708, or data 712.

Hardware platform 700 may include several processors 702. For simplicity and clarity, only processors PROC0 702-1 and PROC1 702-2 are shown. Additional processors (such as 2, 4, 8, 16, 24, 32, 64, or 128 processors) may be provided as necessary, while in other embodiments, only one processor may be provided. Details of processors 702 are not illustrated in this FIGURE. Processors may have any number of cores, such as 1, 2, 4, 8, 16, 24, 32, 64, or 128 cores.

Processors 702 may be any type of processor and may communicatively couple to chipset 716 via, for example, PtP interfaces. Chipset 716 may also exchange data with other elements, such as a high-performance graphics adapter 722.

In alternative embodiments, any or all of the PtP links illustrated in FIG. 7 could be implemented as any type of bus, or other configuration rather than a PtP link. In various embodiments, chipset 716 may reside on the same die or package as a processor 702 or on one or more different dies or packages. Each chipset may support any suitable number of processors 702. A chipset 716 (which may be a chipset, uncore, Northbridge, Southbridge, or other suitable logic and circuitry) may also include one or more controllers to couple other components to one or more CPUs.

Two memories, 704-1 and 704-2 are shown, connected to PROC0 702-1 and PROC1 702-2, respectively. As an example, each processor is shown connected to its memory in a direct memory access (DMA) configuration, though other memory architectures are possible, including ones in which memory 704 communicates with processor 702 via a bus. For example, some memories may be connected via a system bus, or in a data center, memory may be accessible in a remote DMA (RDMA) configuration.

Memory 704 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 704 may be used for short, medium, and/or long-term storage. Memory 704 may store any suitable data or information utilized by platform logic. In some embodiments, memory 704 may also comprise storage for instructions that may be executed by the cores of processors 702 or other processing elements (e.g., logic resident on chipsets 716) to provide functionality.

In certain embodiments, memory 704 may comprise a relatively low-latency volatile main memory, while storage 750 may comprise a relatively higher-latency nonvolatile memory. However, memory 704 and storage 750 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 704 and storage 750, for example, in a single physical memory device, and in other cases, memory 704 and/or storage 750 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 722 may be configured to provide a human-readable visual output, such as a command-line interface (CLI) or graphical desktop such as Microsoft Windows, Apple OSX desktop, or a Unix/Linux X Window System-based desktop. Graphics adapter 722 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 722 may include a hardware graphics card, which may have its own memory and its own graphics processing unit (GPU).

Chipset 716 may be in communication with a bus 728 via an interface circuit. Bus 728 may have one or more devices that communicate over it, such as a bus bridge 732, I/O devices 735, accelerators 746, communication devices 740, and a keyboard and/or mouse 738, by way of nonlimiting example. In general terms, the elements of hardware platform 700 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 740 can broadly include any communication not covered by a network interface and the various I/O devices described herein. This may include, for example, various USB, FireWire, Lightning, or other serial or parallel devices that provide communications.

I/O Devices 735 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, audio I/O 742 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 732 may be in communication with other devices such as a keyboard/mouse 738 (or other input devices such as a touch screen, trackball, etc.), communication devices 740 (such as modems, network interface devices, peripheral interfaces such as PCI or PCIe, or other types of communication devices that may communicate through a network), audio I/O 742, and/or accelerators 746. In alternative embodiments, any portions of the bus architectures could be implemented with one or more PtP links.

Operating system 706 may be, for example, Microsoft Windows, Linux, UNIX, Mac OS X, iOS, MS-DOS, or an embedded or real-time operating system (including embedded or real-time flavors of the foregoing). In some embodiments, a hardware platform 700 may function as a host platform for one or more guest systems that invoke application (e.g., operational agents 708).

Operational agents 708 may include one or more computing engines that may include one or more non-transitory computer-readable mediums having stored thereon executable instructions operable to instruct a processor to provide operational functions. At an appropriate time, such as upon booting hardware platform 700 or upon a command from operating system 706 or a user or security administrator, processor 702 may retrieve a copy of the operational agent (or software portions thereof) from storage 750 and load it into memory 704. Processor 702 may then iteratively execute the instructions of operational agents 708 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 700 may be virtualized, in particular the processor(s) and memory. For example, a virtualized environment may run on OS 706, or OS 706 could be replaced with a hypervisor or virtual machine manager. In this configuration, a virtual machine running on hardware platform 700 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions stored within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and non-limiting example, a magnetic media (e.g., hard drive), a flash memory, a read-only memory (ROM), optical media (e.g., CD, DVD, Blu-Ray), non-volatile random access memory (NVRAM), non-volatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a non-limiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

Example Implementations

The following paragraphs provide various examples of the embodiments disclosed herein.

Example 1 is an apparatus, including a memory element operable to store instructions; and a processor operable to execute the instructions, such that the apparatus is configured to receive data identifying a process and a plurality of files accessed by the process; identify an access indicator for each of the plurality of files accessed by the process, wherein the access indicator includes a file type; determine whether the access indicators exceed a threshold; interrupt, based on a determination that the access indicators exceed a threshold, the process; and prompt a user to allow or disallow the process to proceed.

Example 2 may include the subject matter of Example 1, and may further specify that the threshold is equal to 12 file types.

Example 3 may include the subject matter of Examples 1 or 2, and may further specify that the access indicator is a first access indicator and the threshold is a first threshold, and may be further configured to identify a second access indicator for each of the plurality of files accessed by the process; and determine whether the second access indicators exceed a second threshold.

Example 4 may include the subject matter of Example 3, and may further specify that the second access indicator is a number of files accessed for each file type.

Example 5 may include the subject matter of Example 4, and may further specify that the first threshold is equal to 10 file types and the second threshold is equal to each file type being accessed at least 10 times.

Example 6 may include the subject matter of Example 3, and may further specify that the second access indicator is an age of the files accessed.

Example 7 may include the subject matter of Example 6, and may further specify that the first threshold is equal to 10 file types and the second threshold is equal to 10 files being more than 6 months old.

Example 8 may include the subject matter of Example 3, and may further specify that the second access indicator is a frequency of accessing the plurality of files.

Example 9 may include the subject matter of Example 8, and may further specify that the first threshold is equal to 20 file types and the second threshold is equal to the 20 file types being accessed in 30 seconds or less.

Example 10 may include the subject matter of any of Examples 1-9, further configured to monitor the process accessing the plurality of files; and store the access indicator identified for each of the plurality of files accessed by the process.

Example 11 may include the subject matter of any of Examples 1-10, further configured to send, to a cloud server, metadata and access data associated with the process to determine whether the process includes ransomware.

Example 12 is at least one non-transitory computer-readable medium including one or more instructions that when executed by a processor, cause the processor to monitor a process accessing a plurality of files; identify an access indicator associated with each of the plurality of files accessed by the process, wherein the access indicator includes a file type; store the access indicator identified for each of the plurality of files accessed by the process; determine whether the access indicators exceed a threshold; interrupt, based on a determination that the access indicators exceed a threshold, the process; and prompt a user to allow or disallow the process to proceed.

Example 13 may include the subject matter of Example 12, and may further specify that the threshold is equal to 8 file types.

Example 14 may include the subject matter of Examples 12 or 13, and may further specify that the access indicator is a first access indicator and the threshold is a first threshold, and may further include one or more instructions that when executed by a processor, cause the processor to identify a second access indicator associated with each of the plurality of files accessed by the process; and determine whether the second access indicators exceed a second threshold.

Example 15 may include the subject matter of Example 14, and may further specify that the second access indicator is a number of files accessed for each file type.

Example 16 may include the subject matter of Example 15, and may further specify that the first threshold is equal to 5 file types and the second threshold is equal to each file type being accessed at least 5 times.

Example 17 is a method, including receiving data identifying a process and a plurality of files accessed by the process; identifying an access indicator associated with each of the plurality of files accessed by the process, wherein the access indicator includes a file type; determining whether the access indicator exceeds a threshold; interrupting, based on a determination that the access indicators exceed a threshold, the process; and prompting a user to allow or disallow the process to proceed.

Example 18 may include the subject matter of Example 17, and may further specify that the threshold is equal to 8 file types.

Example 19 may include the subject matter of Example 17, and may further specify that the threshold is equal to 12 file types.

Example 20 may include the subject matter of Example 17, and may further include sending, to a cloud server, metadata and access data associated with the process to determine whether the process includes ransomware; receiving, from the cloud server, processed data identifying whether the process includes ransomware; identifying, based on a determination that the process includes ransomware, a corrective action; and prompting the user to take the corrective action.

The invention claimed is:

1. An apparatus, comprising:
a memory element operable to store instructions; and
a processor operable to execute the instructions, such that the apparatus is configured to:
receive data identifying a process and a plurality of files accessed by the process;
identify a first access indicator of a plurality of access indicators for each of the plurality of files accessed by the process, wherein the first access indicator is a file type;
identify a second access indicator of the plurality of access indicators for each of the plurality of files accessed by the process, wherein the plurality of access indicators are selected from the group consisting of the file type, an age of a file that was accessed, a number of files per file type that were accessed, and a frequency that files were accessed;
based on a determination that a first threshold based on the first access indicator is satisfied, determine whether a second threshold based on the second access indicator of the plurality of access indicators is satisfied, wherein the first threshold is defined by exceeding at least five file types;
interrupt, based on a determination that the second threshold is satisfied, the process; and
prompt a user to allow or disallow the process to proceed.

2. The apparatus of claim 1, wherein the first threshold is partially based on 12 file types being accessed by the process.

3. The apparatus of claim 1, wherein the second access indicator from the plurality of access indicators is the number of files accessed for each file type.

4. The apparatus of claim 3, wherein the first threshold is 10 different file types being accessed, and the second threshold is the file types being accessed at least 10 times.

5. The apparatus of claim 1, wherein the second threshold is based on an age of the files accessed.

6. The apparatus of claim 5, wherein the first threshold is equal to 10 file types that were accessed, and the second threshold is 10 files of the file types that were accessed being more than 6 months old.

7. The apparatus of claim 1, wherein the second access indicator is based on a frequency of accessing the plurality of files.

8. The apparatus of claim 7, wherein the first threshold is based on 20 different file types being accessed, and the second threshold is the file types being accessed in 30 seconds or less.

9. The apparatus of claim 1, further configured to:
monitor the process accessing the plurality of files; and
store the plurality of access indicators identified for each of the plurality of files accessed by the process.

10. The apparatus of claim 1, further configured to:
send, to a cloud server, metadata and access data associated with the process to determine whether the process includes ransomware.

11. At least one non-transitory computer-readable medium comprising one or more instructions that, when executed by a processor, cause the processor to:
monitor a process accessing a plurality of files;
identify a first access indicator of a plurality of access indicators for each of the plurality of files accessed by the process, wherein the first access indicator is a file type;

identify a second indicator of the plurality of access indicators associated with each of the plurality of files accessed by the process, wherein the plurality of access indicators are selected from the group consisting of the file type, an age of a file that was accessed, a number of files per file type that were accessed, and a frequency that files were accessed;

store the plurality of access indicators identified for each of the plurality of files accessed by the process;

based on a determination that a first threshold based on the first access indicator is satisfied, determine whether a second threshold based on the second access indicator of the plurality of access indicators is satisfied, wherein the first threshold is defined by exceeding at least five file types;

interrupt, based on a determination that the second threshold is satisfied, the process; and prompt a user to allow or disallow the process to proceed.

12. The at least one non-transitory computer-readable medium of claim 11, wherein the first threshold is partially based on 8 file types being accessed by the process.

13. The at least one non-transitory computer-readable medium of claim 11, wherein the second access indicator from the plurality of access indicators is the number of files accessed for each file type.

14. The at least one non-transitory computer-readable medium of claim 13, wherein the first threshold is 15 different file types being accessed, and the second threshold is the file types being accessed at least 5 times.

15. A method, comprising:

receiving data identifying a process and a plurality of files accessed by the process;

identifying a first access indicator of a plurality of access indicators for each of the plurality of files accessed by the process, wherein the first access indicator is a file type;

identifying a second access indicator of the plurality of access indicators associated with each of the plurality of files accessed by the process, wherein the plurality of access indicators are selected from the group consisting of the file type, an age of a file that was accessed, a number of files per file type that were accessed, and a frequency that files were accessed;

based on a determination that a first threshold based on the first access indicator is satisfied, determining whether a second threshold based on the second access indicator of the plurality of access indicators is satisfied, wherein the first threshold is defined by exceeding at least five file types;

interrupting, based on a determination that the second threshold is satisfied, the process; and prompting a user to allow or disallow the process to proceed.

16. The method of claim 15, wherein the first threshold is equal to 8 or more different file types being accessed by the process, the second threshold is the file types being accessed in 30 seconds or less, and the method further comprises:

determining that at least 10 files of the file types that were accessed are more than 6 months old.

17. The method of claim 15, wherein the first threshold is equal to 12 or more different file types accessed by the process, the second threshold is the file types being accessed in 60 seconds or less, and the method further comprises:

determining that at least 10 files of the file types that were accessed are more than 6 months old.

18. The method of claim 15, further comprising:

sending, to a cloud server, metadata and access data associated with the process to determine whether the process includes ransomware;

receiving, from the cloud server, processed data identifying whether the process includes ransomware;

identifying, based on a determination that the process includes ransomware, a corrective action; and prompting the user to take the corrective action.

* * * * *